(12) United States Patent
Forney

(10) Patent No.: US 6,279,321 B1
(45) Date of Patent: Aug. 28, 2001

(54) METHOD AND APPARATUS FOR GENERATING ELECTRICITY AND POTABLE WATER

(76) Inventor: James R Forney, P.O. Box 400, Rawlins, WY (US) 82301

( * ) Notice: Subject to any disclaimer, the term of this patent is extended or adjusted under 35 U.S.C. 154(b) by 0 days.

(21) Appl. No.: 09/575,547

(22) Filed: May 22, 2000

(51) Int. Cl.⁷ .................................. F03G 6/00; F03G 7/00

(52) U.S. Cl. ...................................... 60/641.11; 60/641.15

(58) Field of Search ................................ 60/641.8, 641.9, 60/641.11, 641.15

(56) References Cited

U.S. PATENT DOCUMENTS

| | | | |
|---|---|---|---|
| 4,211,620 | * 7/1980 | Fowler | 204/129 |
| 4,539,078 | * 9/1985 | Wingfield | 204/1 R |
| 4,599,865 | * 7/1986 | Dalal | 60/673 |
| 5,228,529 | * 7/1993 | Rosner | 180/65.3 |
| 5,347,986 | 9/1994 | Cordy . | |
| 5,658,448 | 8/1997 | Lasich . | |
| 5,672,250 | 9/1997 | Ambadar et al. . | |
| 5,857,322 | * 1/1999 | Cohn | 60/641.8 X |
| 5,900,330 | * 5/1999 | Kagatani | 429/17 |

* cited by examiner

Primary Examiner—Hoang Nguyen
(74) Attorney, Agent, or Firm—Michael I. Kroll

(57) ABSTRACT

The present invention 10 discloses a system for generating electricity and potable water 42. The system comprises an array of solar cells 12 which produce an amount of current. The solar cells have electrical connection means 14 to a bank of batteries 18. The batteries are connected by electrical connection means to an electrolytic device 20. The positive pole of the battery is connected to the cathode electrode 46 and the negative pole is connected to the anode electrode 48 which induces the electric current to pass through the liquid electrolyte 24. The current dissociates the water into its collectable gaseous component parts, oxygen and hydrogen. The oxygen is released into the atmospheric air but could be collected for some further process. A compressor 26 having electrical connection means to the batteries 18 and connection means to the electrolytic device 20 collects the hydrogen gas. A storage tank 28 having ingress connection means with the compressor stores the compressed hydrogen gas for use by additional components of the system. The storage tank further has egress control means for supplying a regulated amount of hydrogen gas to a boiler 34. The boiler 34 has electrical connection means 14 to the batteries 18 for energizing control devices, such as electronic firing, and thermal control devices and has ingress connection means 32 with the hydrogen storage tank 28 and steam egress connection means 36 with the steam turbine 38. The steam turbine 28 has electrical connection means 14 to the batteries 18 for energizing the necessary components of the turbine, as well as, ingress water connection means 50 with the boiler 34 which produces the steam which turns the turbine blades and the steam turbine has egress connection means 52 with a water vapor storage tank wherein the steam, which was used to rotate the turbine blades, is collected through the condenser 40 unit providing a source of potable water 42. The electrical output of the steam turbine can be used as an alternate or primary source of electricity for a structure 44 and can additionally feed any residual electrical output into the municipal power grid 13.

2 Claims, 9 Drawing Sheets

METHOD AND APPARATUS FOR GENERATING ELECTRICITY AND POTABLE WATER

BACKGROUND OF THE INVENTION

1. Field of the Invention

The present invention relates generally to electrical generation systems and, more specifically, to a system combining several discrete components whereby sunlight is the catalyst energy form used to create electricity which can be used to energize a structure, home, and/or building with the surplus electricity being fed into the municipal power grid. In addition said system can produce a quantity of potable water.

Said system comprises an array of solar cells which produce an amount of current. The solar cells have electrical connection means to a DC converter that converts the current into AC current and having electrical connection means to a bank of batteries. The plurality of batteries stores the DC current and having electrical connection means, supplies DC current to additional components within the system. The batteries are connected by electrical connection means to an electrolytic device. The electrolytic device consisting electrodes and an amount of liquid electrolyte, preferably water. The positive pole of the battery is connected to the cathode electrode and the negative pole is connected to the anode electrode which induces the electric current to pass through the liquid electrolyte, water. The current dissociates the water into its collectable gaseous component parts, oxygen and hydrogen. The oxygen is released into the atmospheric air but could be collected for some further process. A compressor having electrical connection means to the batteries and connection means to the electrolytic device collects the hydrogen gas. A storage tank having ingress connection means with the compressor stores the compressed hydrogen gas for use by additional components of the system. Said storage tank, further, has egress control means for supplying a regulated amount of hydrogen gas to a boiler. The boiler has electrical connection means to the batteries for energizing control devices, such as electronic firing, and thermal control devices. Further having ingress connection means with the hydrogen storage tank and steam egress connection means with a steam turbine. The steam turbine has electrical connection means to the batteries for energizing the necessary components of the turbine, as well as, ingress water connection means with the boiler which produces the steam which turns the turbine blades and said steam turbine has egress connection means with a water vapor storage tank wherein the steam, which was used to rotate the turbine blades, is collected through the condenser unit providing a source of potable water. The electrical output of the steam turbine can be used as an alternate or primary source of electricity for a structure and can additional feed any residual electrical output into the municipal power grid.

2. Description of the Prior Art

There are other solar powered device designed for producing electricity. Typical of these is U.S. Pat. No. 5,658,448 issued to Lasich on Aug. 19, 1997.

Another patent was issued to Cordy on Sep. 20, 1994 as U.S. Pat. No. 5,347,986. Yet another U.S. Pat. No. 5,672,250 was issued to Ambadar et al. on Sep. 30, 1997 and still yet another was issued on Jul. 15, 1986 to Dalal as U.S. Pat. No. 4,599,865.

U.S. Pat. No. 5,658,448

Inventor: John Beavis Lasich

Issued: Aug. 19, 1997

Method and apparatus for producing hydrogen by conversion of solar energy into thermal and electrical energy for electrolysis of steam.

U.S. Pat. No. 5,347,986

Inventor: Clifford B. Cordy

Issued: Sep. 20, 1994

A point focus distributed receiver system for generating high-pressure steam by means of solar energy collection is disclosed. The cradle within which a gimbal mounted concentrator dish rotates is designed to withstand high wind forces by delivering all forces along the polar axis to the equatorial end of the cradle, requires only one structural member to withstand flexural forces and provides an unobstructed volume behind the axis of rotation for the concentrator dish to rotate in. The concentrator dish comprises a plurality of segments whose bracing forms a tee-pee-like structure behind the dish. The receiver of the present invention further discloses a receiver cavity which achieves maximum blackness in a minimum depth and volume, a combined heat shield/secondary reflector and a plumbing system which permits the receiver system to operate successfully when the concentrator dish is nearly perpendicular to the ground.

U.S. Pat. No. 5,672,250

Inventor: Husein Ambadar et. Al.

Issued: Sep. 30, 1997

A solar seawater desalination system is designed to operate in a self-sustaining manner without the need for any moving parts. Seawater is converted to steam in a solar heat collector panel and the steam is led in a steam pipe through a series of cooling chambers where it is condensed by incoming seawater in tanks jacketing the steam tube. The tanks are connected in series between an inlet air-lock regulator and the solar collector panel so that the seawater is caused to flow successively through the tanks from the inlet to the collector panel as make-up water, solely by pressure differentials created in the system by the steam generation. Excessively saline seawater which collects in the collector panel is dumped from the system in a similar manner through an outlet air-lock regulator. Secondary cooling chambers may be provided to condense steam generated from the seawater in the primary cooling chambers by heat received from the steam pipe.

U.S. Pat. No. 4,599,865

Inventor: Rajendra P. Dalai

Issued: Jul. 15, 1986

A method and apparatus for combustion of hydrogen to produce heat, for example to generate steam for power generation. Water is electrolyzed and the hydrogen and a fraction of the oxygen products of electrolysis are passed immediately to a first combustion zone where the immediate combustion of the oxygen products and a function of the hydrogen products is effected. The products from this first combustion zone are immediately passed to a second combustion zone where combustion is again effected with the remaining fraction of the oxygen products of the electrolysis and the remaining hydrogen products from the first combustion zone. The heat generated is thereafter applied to the desired use, for example by passing the products of combustion from the second combustion zone through water to boil the water, the steam thereby produced being used for power generation. Apparatus to carry out this method is also described.

While these electricity-generating devices may be suitable for the purposes for which they were designed, they would not be as suitable for the purposes of the present invention, as hereinafter described.

SUMMARY OF THE PRESENT INVENTION

The present invention discloses a system for generating electricity and potable water. The system comprises an array of solar cells which produce an amount of current. The solar cells have electrical connection means to a bank of batteries. The batteries are connected by electrical connection means to an electrolytic device. The current dissociates the water into its collectable gaseous component parts, oxygen and hydrogen. The oxygen is released into the atmospheric air but could be collected for some further process. A compressor having electrical connection means to the batteries and connection means to the electrolytic device collects the hydrogen gas. A storage tank having ingress connection means with the compressor stores the compressed hydrogen gas for use by additional components of the system. The storage tank further has egress control means for supplying a regulated amount of hydrogen gas to a boiler. The boiler has electrical connection means to the batteries for energizing control devices, such as electronic firing, and thermal control devices and has ingress connection means with the hydrogen storage tank and steam egress connection means with the steam turbine. The steam turbine has electrical connection means to the batteries for energizing the necessary components of the turbine, as well as, ingress water connection means with the boiler which produces the steam which turns the turbine blades and steam turbine has egress connection means with a water vapor storage tank wherein the steam, which was used to rotate the turbine blades, is collected through the condenser unit providing a source of potable water. The electrical output of the steam turbine can be used as an alternate or primary source of electricity for a structure and can additionally feed any residual electrical output into the municipal power grid.

A primary object of the present invention is to provide a standalone system for generating electricity.

Another object of the present invention is to provide a standalone electrical generating system using sunlight as the catalyst energy form to create electricity which can be used to energize a structure, home, and/or building.

Yet another object of the present invention is to provide a standalone electrical generating system using sunlight as the catalyst energy form to create electricity which can be fed into the municipal power grid.

Still yet another object of the present invention is to provide a standalone electrical generating system which can additionally produce a quantity of potable water.

Yet another object of the present invention is to provide a standalone electrical generating system using sunlight as the catalyst energy form to create electricity which is stored in batteries to be used by an electrolytic device to produce hydrogen which is collected and compressed for use by a boiler to generated steam which powers a steam turbine that produces electricity.

Additional objects of the present invention will appear as the description proceeds.

The present invention overcomes the shortcomings of the prior art by providing an electrical generation systems comprising discrete components utilizing sunlight as the catalyst energy form to generate electricity which can be used to energize a structure, home, and/or building with the surplus electricity being fed into the municipal power grid. In addition said system can produce a quantity of potable water.

Said system comprises an array of photovoltaic cells which produce current. The solar cells have electrical connection means to a voltage regulator having electrical connection means to a bank of batteries for charging said batteries. The bank of batteries stores the current and having electrical connection means, supplies said current to additional components within the system. The batteries are connected by electrical connection means to an electrolytic device. The electrolytic device consisting electrodes and an amount of liquid electrolyte, preferably water. The positive pole of the battery is connected to the cathode electrode and the negative pole is connected to the anode electrode which induces the electric current to pass through the liquid electrolyte, water. The current dissociates the water into its collectable gaseous component parts, oxygen on the negative side and hydrogen on the positive. The oxygen is released into the atmospheric air but could be collected for some further process. A compressor having electrical connection means to the batteries and connection means to the electrolytic device collects the hydrogen gas. A storage tank having ingress water connection means with the compressor stores the compressed hydrogen gas for use by additional components of the system. Said storage tank, further, has egress control means for supplying a regulated amount of hydrogen gas to a boiler. The boiler has electrical connection means to the batteries for energizing control devices, such as electronic firing, and thermal control devices. Further having ingress connection means with the hydrogen storage tank and steam egress connection means with a steam turbine. The steam turbine has electrical connection means to the batteries for energizing the necessary components of the turbine, as well as, ingress water connection means with the boiler which produces the steam which turns the turbine blades and said steam turbine has egress connection means with a water vapor condenser wherein the steam, which was used to rotate the turbine blades, is collected and cooled therein providing a source of potable water. The electrical output of the steam turbine can be used as an alternate or primary source of electricity for a structure and can additional feed any residual electrical output into the municipal power grid.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
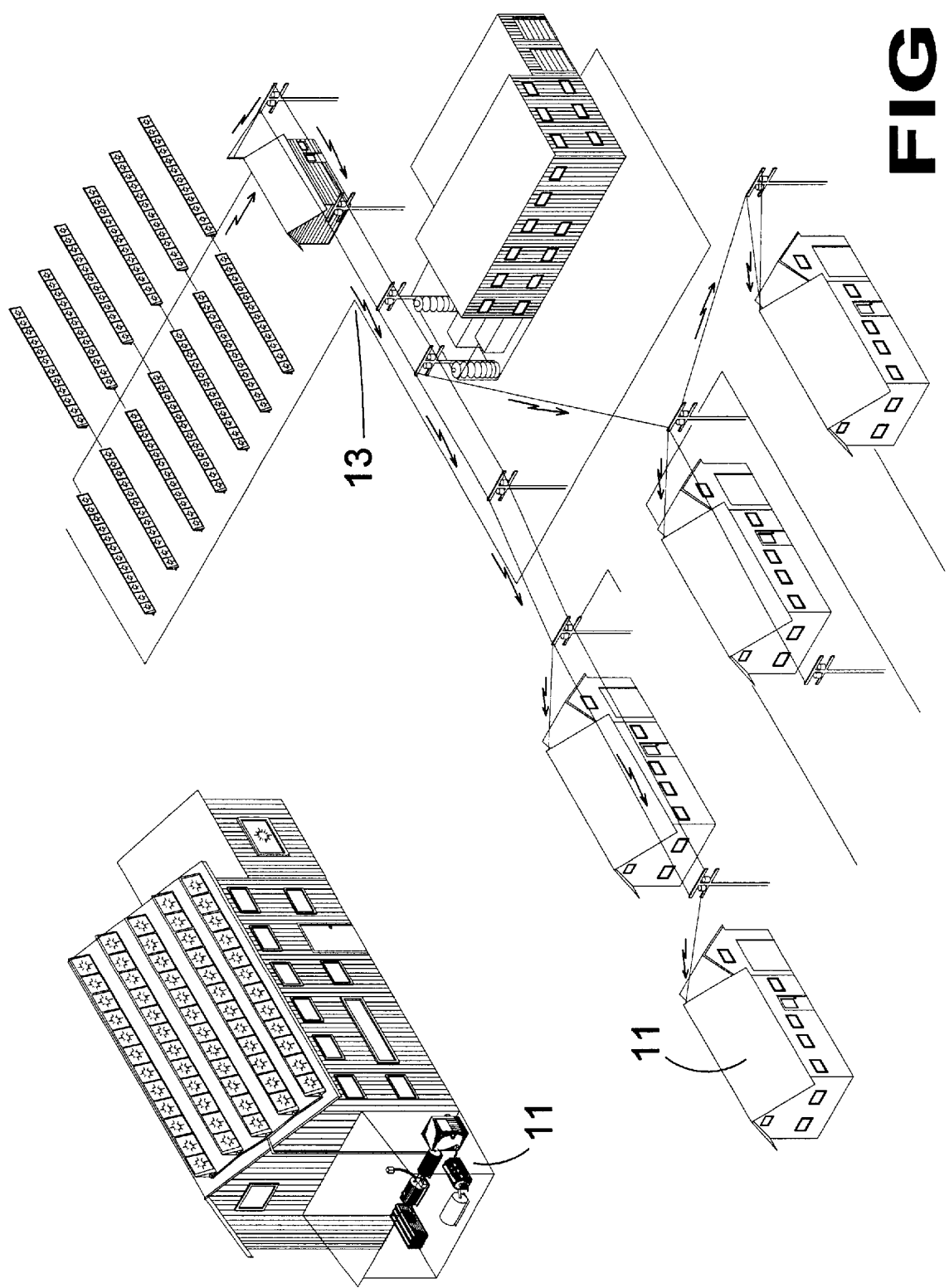
FIG. 1 is an illustrative view of the present invention in use. Shown is a standalone system wherein sunlight is the catalyst energy form used to create electricity which can be used to energize a structure, home, and/or building with the surplus electricity being fed into the municipal power grid. In addition said system can produce a quantity of potable water.

With regard to reference numerals used, the following numbering is used throughout
10 present invention
11 home or building
12 solar cells
13 power grid
14 electrical connection means
15 hydrogen line
16 DC voltage regulator
18 batteries
20 electrolytic device
22 electrodes
24 electrolyte
26 compressor
27 compressor storage tank
28 storage tank
30 ingress connection means to storage tank
32 egress connection means from storage tank
34 boiler
36 steam egress connection means
38 steam turbine
40 condenser
42 potable water
44 structure
46 cathode
48 anode
50 water inlet
52 connection means
54 DC converter

DESCRIPTION OF THE PREFERRED EMBODIMENT(S)

In order that the invention may be more fully understood, it will now be described, by way of example, with reference to the accompanying drawings in which FIGS. 1 through 9 illustrate the present invention being a device for generating electricity and potable water.

Turning to FIG. 1, shown therein is an overall illustrative view of the present invention in use. Shown is a self-contained system wherein sunlight is the catalyst energy form used to create electricity which can be used to energize a structure, home, and/or building 11 with the surplus electricity being fed into the municipal power grid 13. In addition the system can produce a quantity of potable water as hereinafter disclosed.

Figure 2:
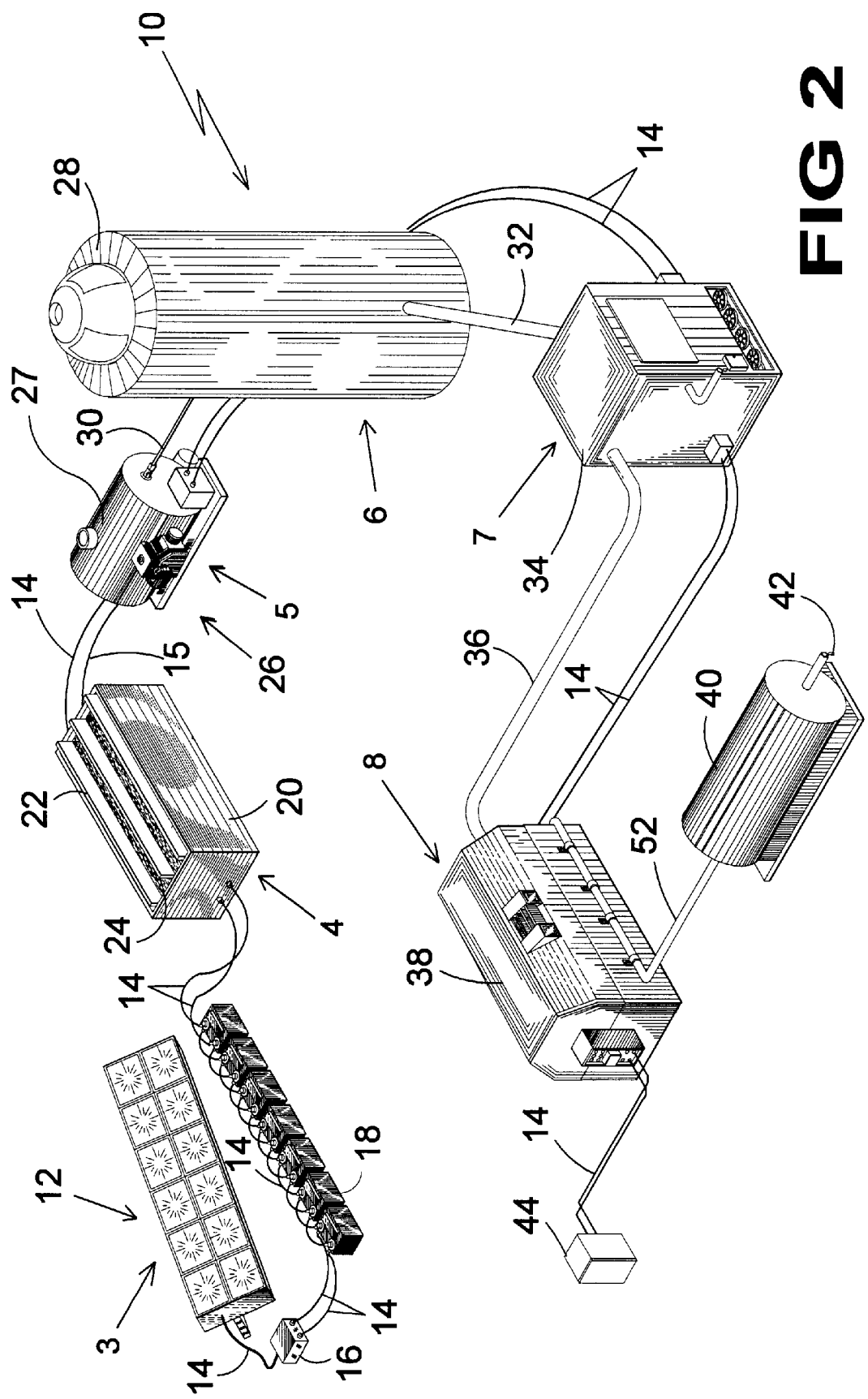
FIG. 2 is an illustrative view of the components of the present invention and interrelationship therein for generating electricity and potable water. Shown is a system combining several discrete components whereby sunlight is the catalyst energy form used to create electricity which can be used to energize a structure, home, and/or building with the surplus electricity being fed into the municipal power grid. In addition said system can produce a quantity of potable water.

Turning to FIG. 2, shown therein is an illustrative view of the components of the present invention 10 and interrelationship therein for generating electricity and potable water. Shown is a system combining several discrete components whereby sunlight is the catalyst energy form used to create electricity which can be used to energize a structure, home, and/or building with the surplus electricity being fed into the municipal power grid The system comprises an array of solar cells 12 which produce an amount of current. The solar cells have electrical connection means 14 to a DC voltage regulator 16 that regulates the current and has electrical connection means 14 to a bank of batteries 18. The bank of batteries stores the DC current and having electrical connection means 14, supplies DC current to additional components within the system. The batteries are connected by electrical connection means 14 to an electrolytic device 20. The electrolytic device consists of electrodes 22 and an amount of liquid electrolyte 24, preferably water. The current dissociates the water into its collectable gaseous component parts, oxygen and hydrogen. The oxygen is released into the atmospheric air but could be collected for some further process. A compressor 26 having electrical connection means 14 to the batteries and connection means 15 to the electrolytic device collects the hydrogen gas in storage tank 27. A second storage tank 28 having ingress connection means 30 with the compressor storage tank 27 stores the compressed hydrogen gas for use by additional components of the system. The storage tank 28, further, has egress control means 32 for supplying a regulated amount of hydrogen gas to a boiler 34. The boiler 34 has electrical connection means 14 to the batteries for energizing control devices, such as electronic firing, and thermal control devices and has ingress connection means 32 with the hydrogen storage tank and steam egress connection means 36 with a steam turbine 38. The steam turbine 38 has electrical connection means 14 to the batteries for energizing the necessary components of the turbine, as well as, ingress steam connection means 36 with the boiler 34 which produces the steam which turns the turbine blades and the steam turbine has egress connection means 52 with a condenser 40 wherein the steam, which was used to rotate the turbine blades, is collected therein providing a source of potable water 42. The electrical output of the steam turbine can be used as an alternate or primary source of electricity for a structure 44 and can additionally feed any residual electrical output into the municipal power grid using electrical connection 14.

Figure 3:
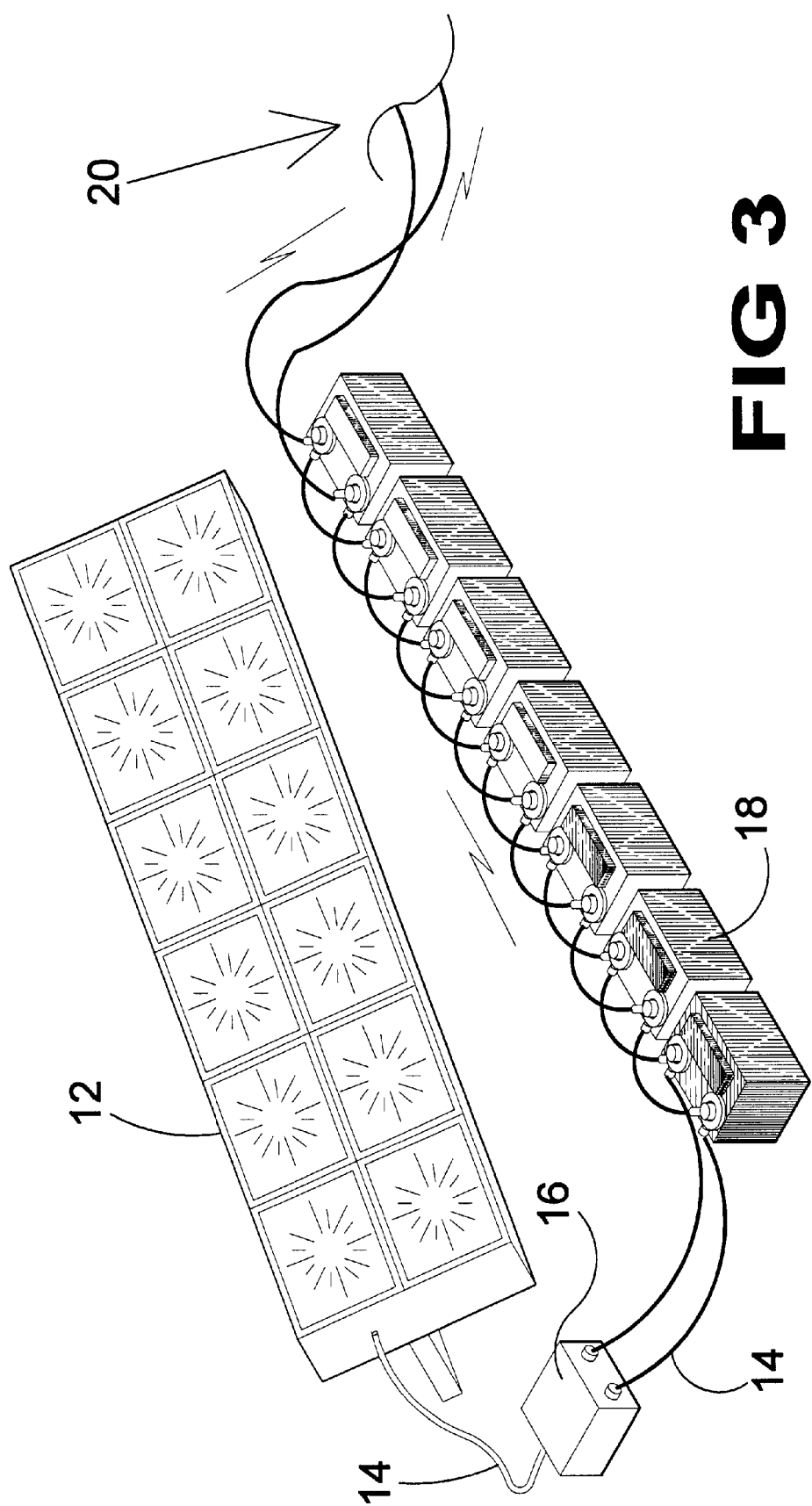
FIG. 3 is a perspective view of the solar panels, DC converter and bank of batteries of the present invention. The solar panels are comprised of a array of photovoltaic cells which convert the rays of the sun to an amount of DC current which is fed into a DC regulator and stored in a bank of batteries for use by various components of the present invention.

Turning to FIG. 3, shown therein is a perspective view of the multiple solar panels 12, DC regulator 16 and bank of batteries 18 of the present invention along with connections 14. The solar panels 12 are comprised of a array of photovoltaic cells which convert the rays of the sun to an amount of DC current which is fed into a DC regulator 16 and stored in a bank of batteries 18 for use by various components of the present invention; e.g., an electrolytic device 20.

Figure 4:
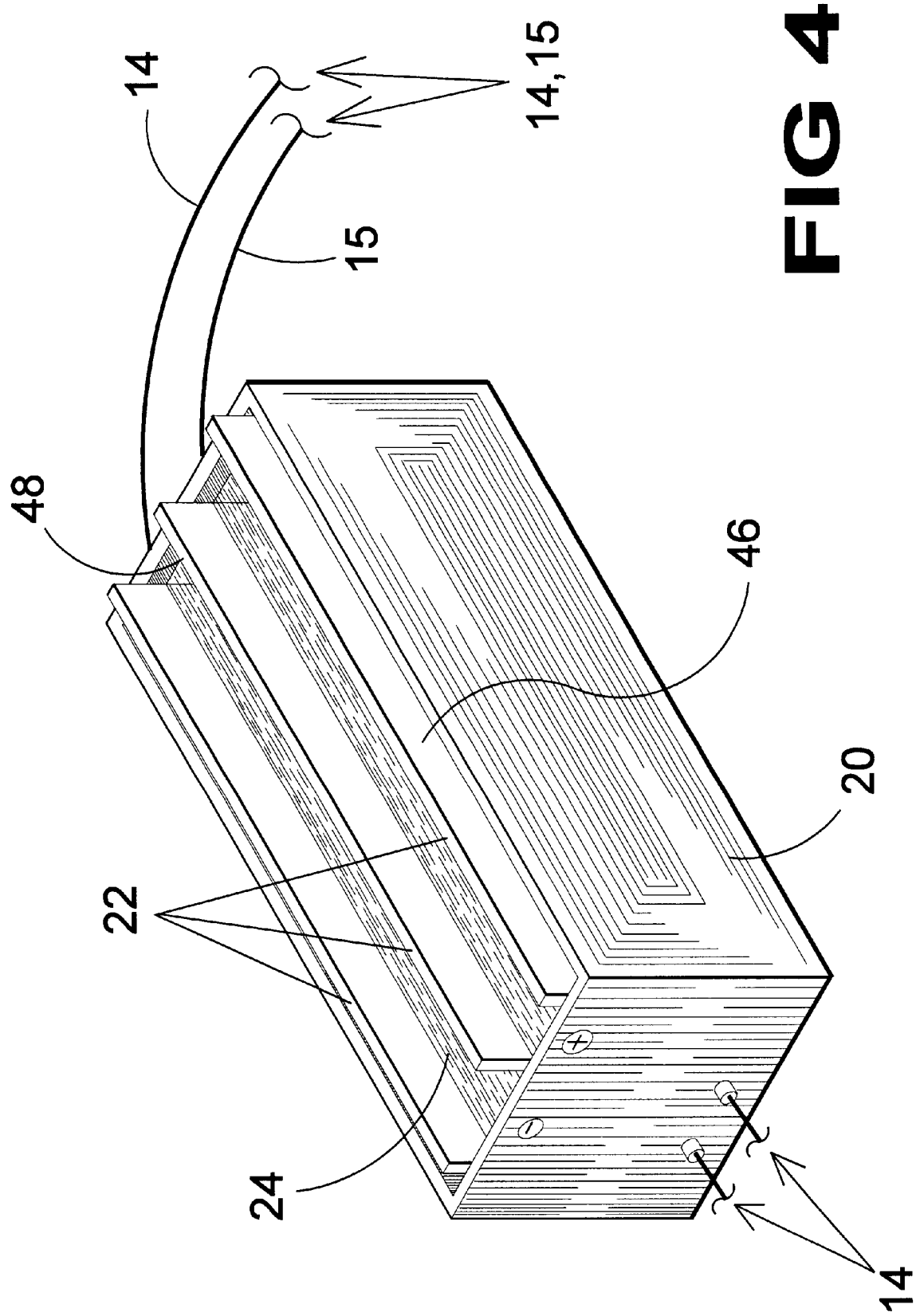
FIG. 4 is a perspective view of the electrolytic device of the present invention. The electrolytic device has electrical connection means to the plurality of batteries. The electrolytic device consisting of electrodes and an amount of liquid electrolyte, preferably water. The positive pole of the battery is connected to the cathode electrode and the negative pole is connected to the anode electrode which induces the electric current to pass through the liquid electrolyte, water. The current dissociates the water into its collectable gaseous component parts, oxygen and hydrogen. The oxygen is released into the atmospheric air but could be collected for some further process. The hydrogen is collected by a compressor and stored for future use by other components within the system.

Turning to FIG. 4, shown therein is a perspective view of the electrolytic device 20 of the present invention. The electrolytic device 20 has electrical connection means 14 to the plurality of batteries. The electrolytic device consists of electrodes 22 and an amount of liquid electrolyte 24, preferably water. The positive pole of the battery is connected to the cathode electrode 46 and the negative pole is connected to the anode electrode 48 which induces the electric current to pass through the liquid electrolyte 24, water. The current dissociates the water into its collectable gaseous component parts, oxygen and hydrogen. The oxygen is released into the atmospheric air but could be collected for some further process. The hydrogen is transmitted through line 15 and is collected by a compressor 26 (not shown) and stored for future use by other components within the system.

Figure 5:
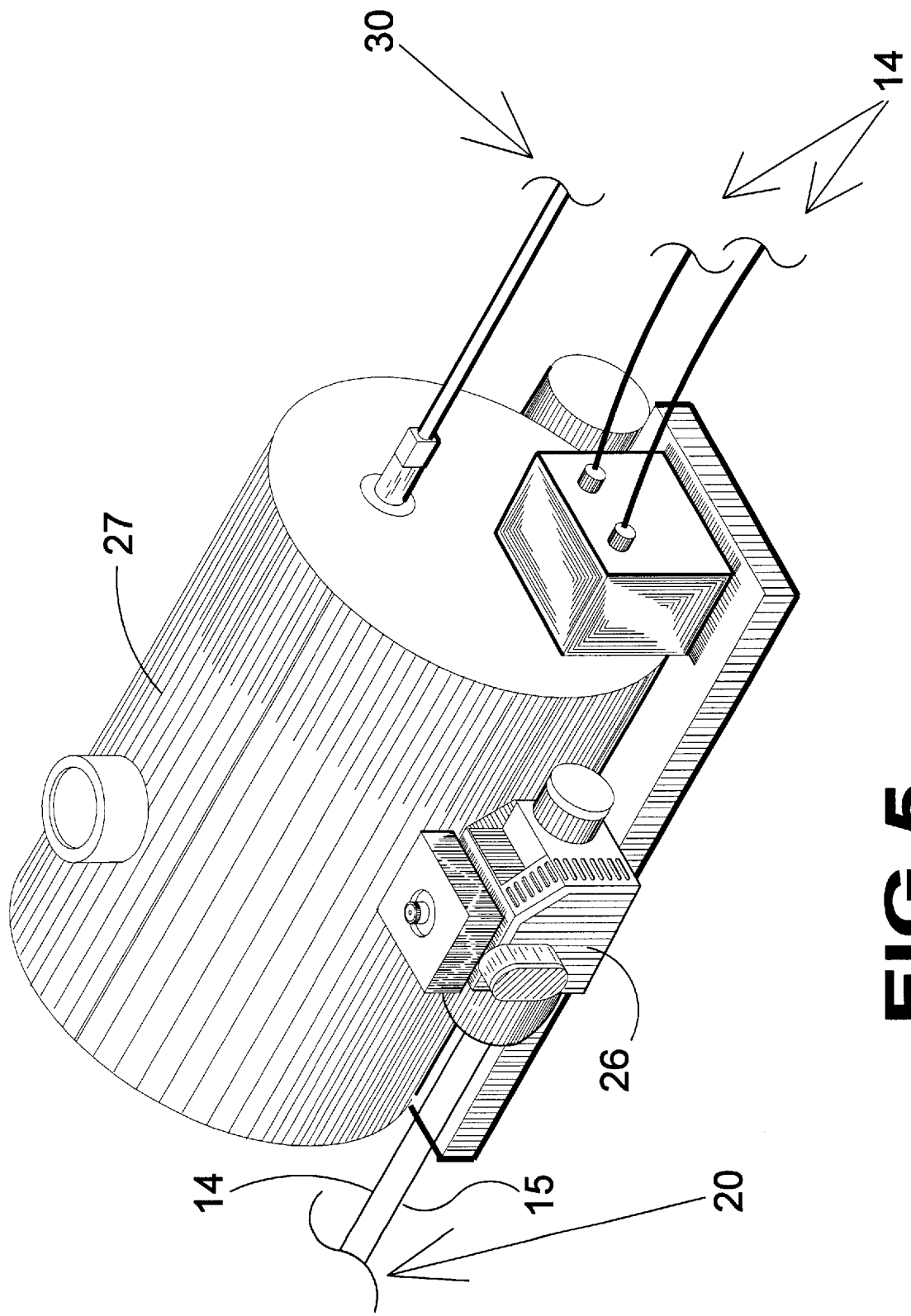
FIG. 5 is a perspective view of the compressor of the present invention. The compressor having electrical connection means to the batteries and connection means to the electrolytic device collects and compresses the hydrogen gas. A storage tank having ingress connection means with the compressor stores the compressed hydrogen gas for use by additional components of the system.

Turning to FIG. 5, shown therein is a perspective view of the compressor 26 of the present invention. The compressor 26 has electrical connection means 14 to the batteries and connection means 15 to the electrolytic device and collects and compresses the hydrogen gas. A first storage tank 27 having ingress connection means with the compressor stores the compressed hydrogen gas for use by additional components of the system. Outlet conduit 30 carries hydrogen to a storage tank 28 (not shown).

Figure 6:
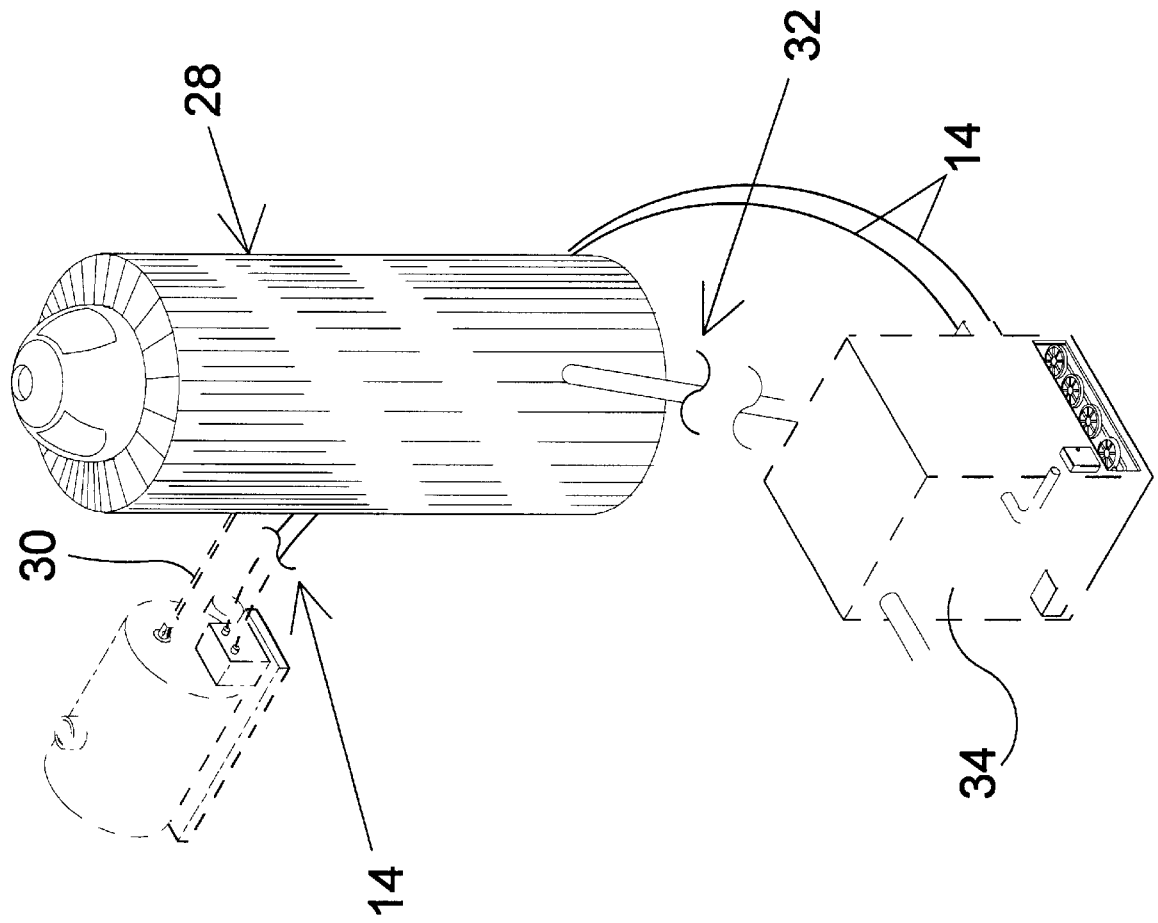
FIG. 6 is a perspective view of the hydrogen storage tank of the present invention. The compressor having electrical connection means to the batteries and connection means to the electrolytic device collects and compresses the hydrogen gas. The storage tank having ingress connection means with the compressor stores the compressed hydrogen gas for use by additional components of the system. Said storage tank, further, has egress control means for supplying a regulated amount of hydrogen gas to a boiler.

Turning to FIG. 6, shown therein is a perspective view of the hydrogen storage tank 28 of the present invention. The storage tank 28 having ingress connection means 30 with the compressor stores the compressed hydrogen gas for use by additional components of the system. The storage tank 28, further, has egress control means 32 for supplying a regulated amount of hydrogen gas to a boiler 34. Electrical connection means 14 are also shown.

Figure 7:
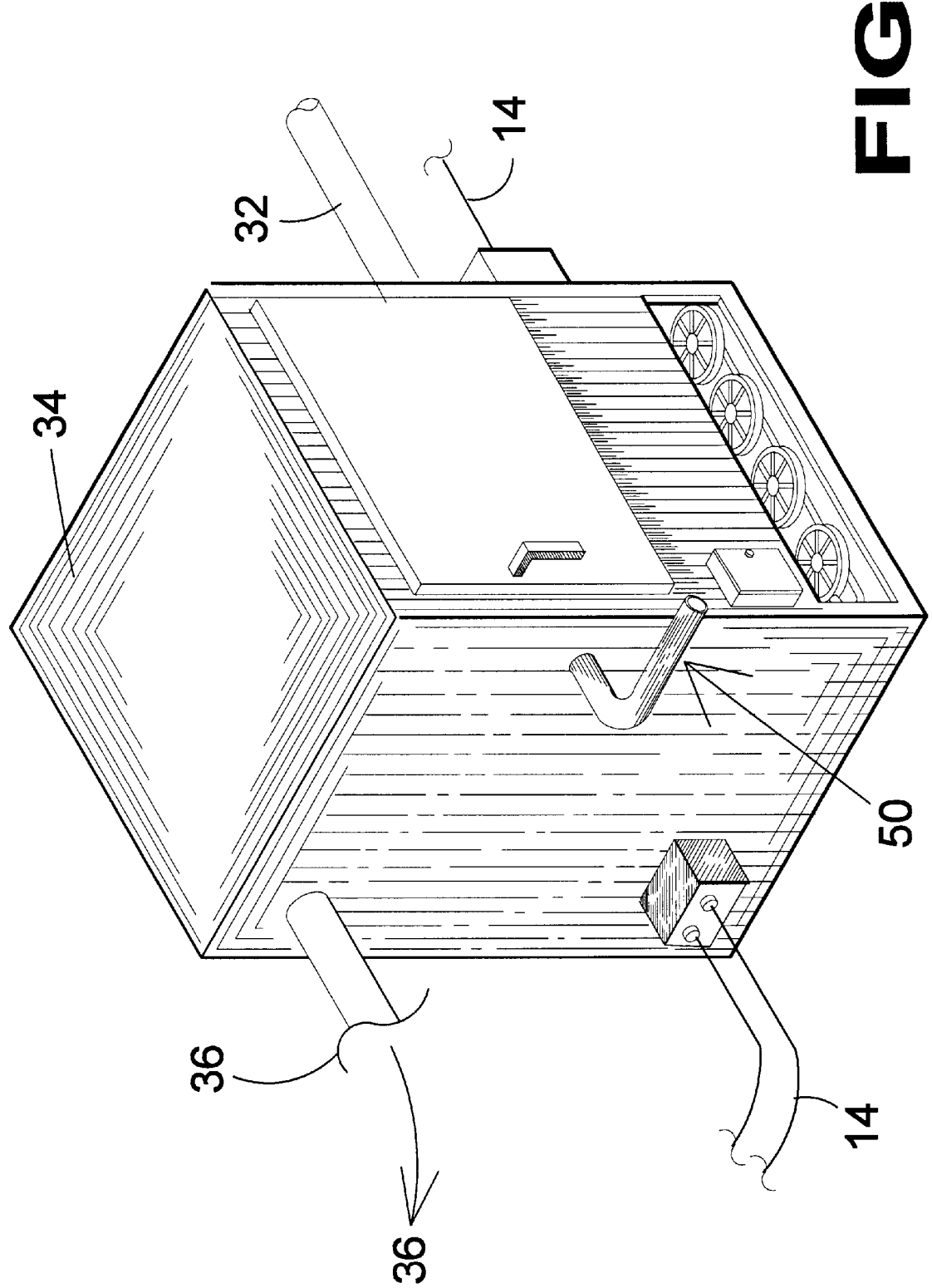
FIG. 7 is a perspective view of the boiler component of the present invention. The boiler has electrical connection means to the batteries for energizing control devices, such as electronic firing, and thermal control devices. Further having ingress connection means with the hydrogen storage tank and steam egress connection means with a steam turbine. The boiler uses the hydrogen gas as a fuel source to generate steam which is used to generate electricity by the steam turbine.
Figure 8:
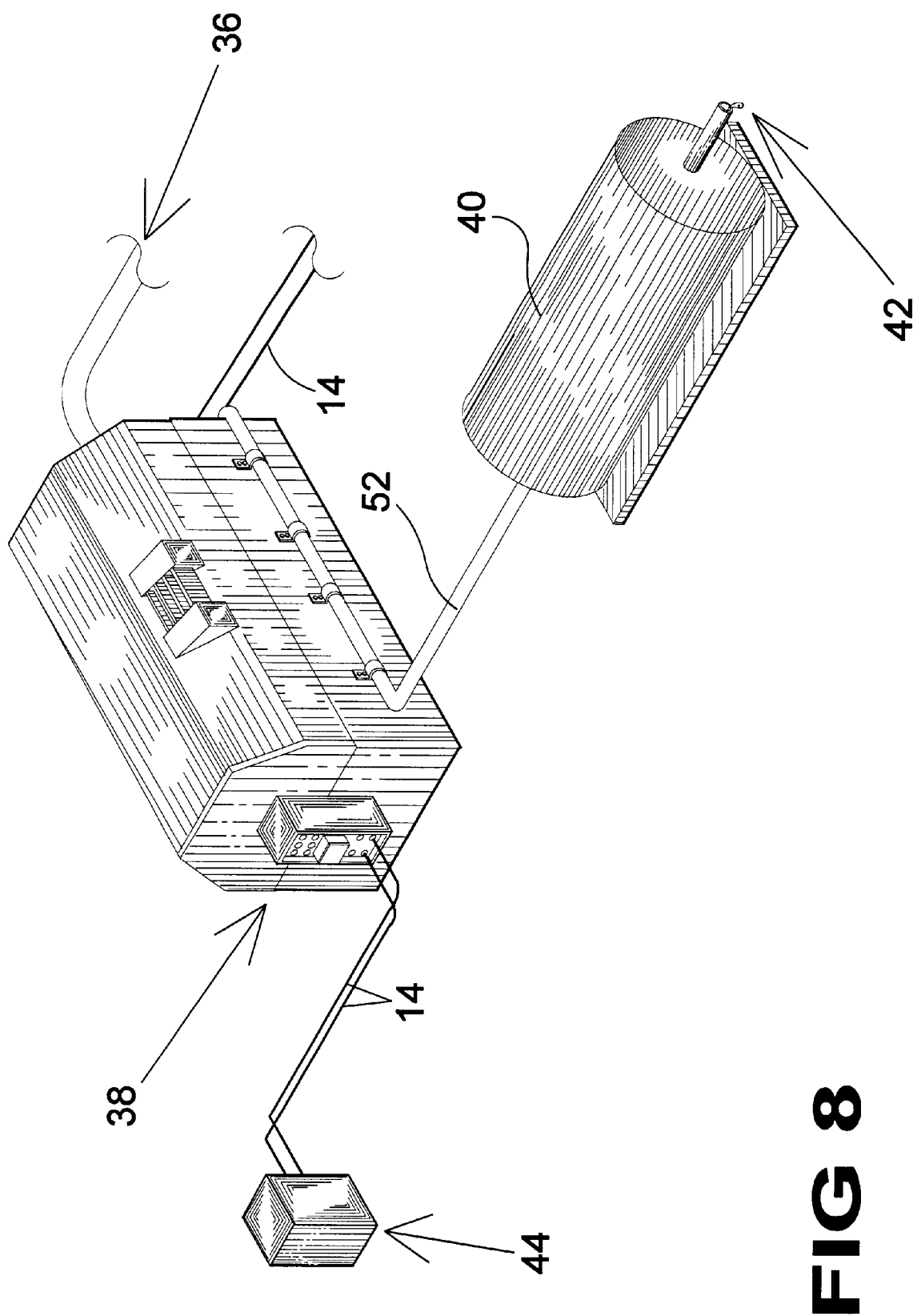
FIG. 8 is a perspective view of the steam driven electric turbine generator. The steam turbine has electrical connection means to the battery components for energizing the necessary circuits of the turbine, as well as, ingress connection means with the boiler which produces the steam which turns the turbine blades. Said steam turbine has egress connection means with a condenser unit wherein the steam which was used to power the turbine is coalesced into water vapor and stored as a source for potable water. The electrical output of the steam turbine can be used as an alternate or primary source of electricity for a structure and can additional feed any residual electrical output into the municipal power grid.

Turning to FIG. 7, shown therein is a perspective view of the boiler 34 component of the present invention. The boiler has electrical connection means 14 to the batteries for energizing control devices, such as electronic firing, and thermal control devices. Also shown is a water inlet 50. Further having ingress connection means 32 with the hydrogen storage tank and steam egress connection means 36 with a steam turbine. The boiler uses the hydrogen gas as a fuel source to generate steam which is used to generate electricity by the steam turbine Turning to FIG. 8, shown therein is a perspective view of the steam driven electric turbine generator 38. The steam turbine has electrical connection means 14 to the battery components for energizing the necessary circuits of the turbine, as well as, ingress connection means 36 with the boiler which produces the steam which turns the turbine blades. The steam turbine has egress connection means 52 with a condenser unit 40 wherein the steam which was used to power the turbine is coalesced into water vapor and stored as a source for potable water 42. The electrical output of the steam turbine can be used as an alternate or primary source of electricity for a structure 44 and can additional feed any residual electrical output into the municipal power grid using electrical connection means 14.

Figure 9:
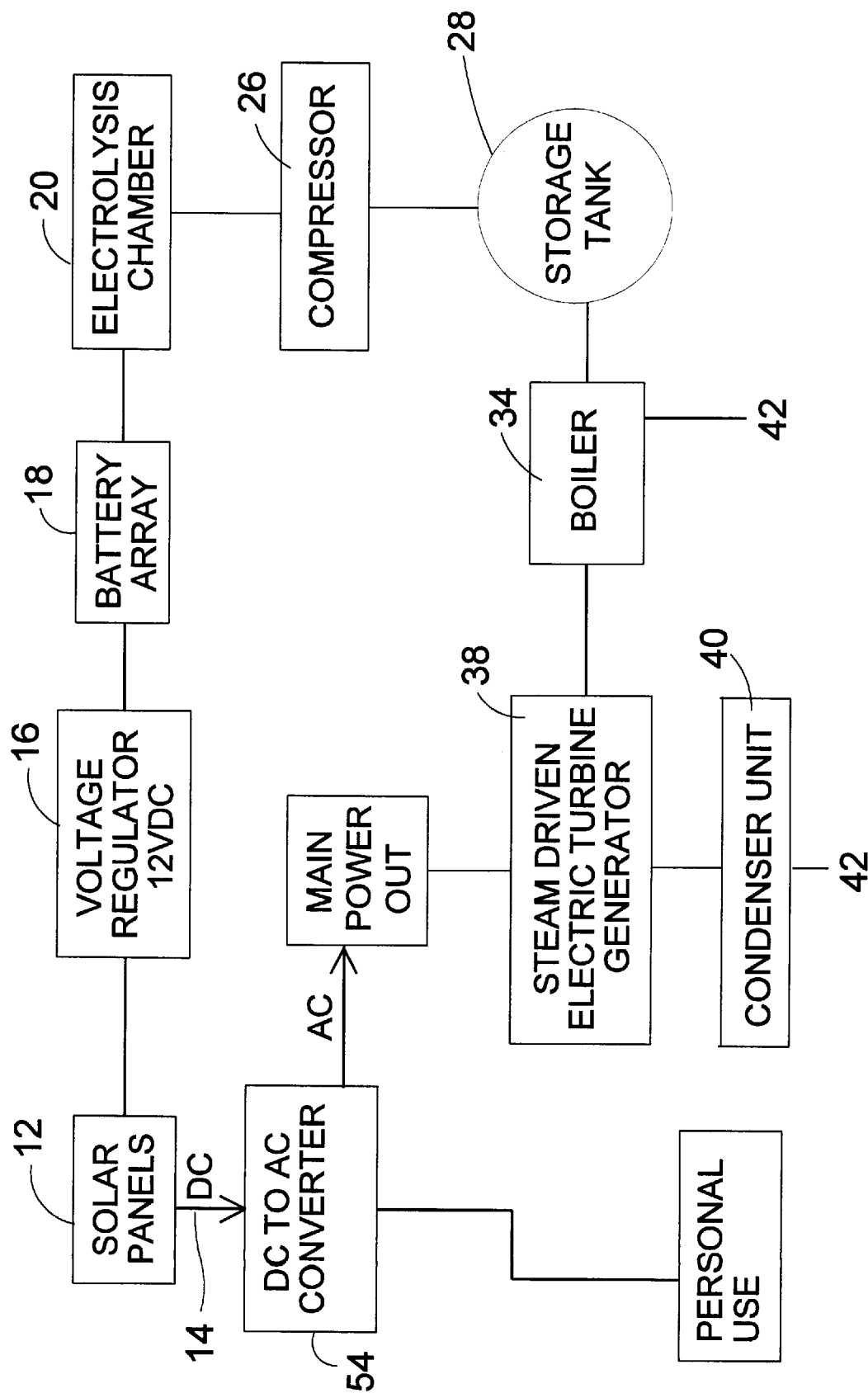
FIG. 9 is a diagrammatic view of the components and interrelationship therein.

Turning to FIG. 9, shown therein is a diagrammatic view of the components and interrelationship therein. Shown is a DC converter 54 which converts the current into AC current. Certain elements previously disclosed are also shown. The present invention thus discloses a process for generating electricity and potable water, comprising the steps of: generating 12 electricity from the sun; regulating 16 the electricity generated from the sun; storing said electricity generated from the sun; electrolytically 20 separating oxygen and hydrogen from an electrolyte using said stored electricity; collecting 27 said hydrogen; compressing 26 said collected hydrogen; storing 28 said compressed hydrogen; generating steam in a boiler 34 using said hydrogen as the fuel; generating electricity from said steam using a steam driven turbine 38; condensing 40 water from said steam driven turbine; and, connecting electrically 14 the components of the process.

What is claimed to be new and desired to be protected by letters patent is set forth in the appended claims:

1. An apparatus for generating electricity and potable water, comprising:

a) a means comprising solar panels for generating electricity from the sun;

b) means for regulating the voltage of said electricity;

c) means for storing said electricity in a battery bank;

d) means utilizing electricity stored in said battery bank having a water electrolyte in a chamber for electrolyzing oxygen gas and hydrogen gas;

e) means for collecting said hydrogen gas and means for compressing said collected hydrogen gas;

f) means for storing said compressed hydrogen gas;

g) boiler means fired by said hydrogen gas for generating steam;

h) means comprising a steam driven turbine for generating electricity, said turbine receiving steam from said boiler means;

i) means for electrically connecting said means for generating electricity, said voltage regulating means, said battery bank, said electrolyzing means, said boiler means, and said steam driven turbine; and j) means for condensing steam discharged from said steam driven turbine for producing potable water.

2. A process for generating electricity and potable water, comprising the steps of:

a) generating electricity from the sun using solar panels;

b) regulating the electricity generated from the sun;

c) storing said electricity generated from the sun;

d) electrolytically separating oxygen and hydrogen from a water electrolyte using said stored electricity;

e) collecting said hydrogen;

f) compressing said collected hydrogen;

g) storing said compressed hydrogen;

h) generating steam in a boiler using said hydrogen as the fuel;

i) generating electricity from said steam using a steam driven turbine and using said electricity in a structure with any surplus electricity being fed into a municipal power grid;

j) condensing waster from said steam driven turbine for producing potable water; and, k) connecting electrically the components of the process.

* * * * *